United States Patent
Altunay et al.

(10) Patent No.: US 6,176,605 B1
(45) Date of Patent: Jan. 23, 2001

(54) HEADLIGHT UNIT FOR A VEHICLE FULFILLING AT LEAST TWO DIFFERENT SETS OF LEGAL REGULATIONS

(75) Inventors: Esref Altunay, Reutlingen; Friedemann Schlienz, Tuebingen, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/133,253

(22) Filed: Aug. 13, 1998

(30) Foreign Application Priority Data

Nov. 14, 1997 (DE) .............................. 197 50 495

(51) Int. Cl.[7] ...................................... B60Q 1/115
(52) U.S. Cl. .................. 362/543; 362/211; 362/295; 362/523; 362/532; 362/544; 362/538; 362/548
(58) Field of Search .................... 362/211, 295, 362/523, 532, 543, 544, 538, 487

(56) References Cited

FOREIGN PATENT DOCUMENTS 42 38 273 A1    5/1994 (DE).

*Primary Examiner*—Thomas M. Sember
*Assistant Examiner*—Anabel M. Ton
(74) *Attorney, Agent, or Firm*—Michael J. Striker

(57) ABSTRACT

The headlight unit has at least one low beam headlight and at least one high beam headlight. The headlight unit is constructed so that it fulfills the different sets of legal regulations for the high beam in both the U.S.A. and Europe. According to the regulations in the U.S.A. the high beam produced by the high beam headlight must have a maximum light intensity in the center of the high beam and at least one required light intensity on the opposing traffic side. The at least one required light intensity on the same traffic side is provided by the low beam propagated from the at least one low beam headlight. This low beam has an asymmetric light-dark boundary that is higher on the same traffic side than on the side of the opposing traffic. According to the European regulations a comparatively higher maximum light intensity is permitted in the center of the high beam and a comparatively lower light intensity is required in the lateral regions. These latter regulations are fulfilled by the high beam produced by the high beam headlight in the headlight unit according to the invention.

2 Claims, 3 Drawing Sheets

HEADLIGHT UNIT FOR A VEHICLE FULFILLING AT LEAST TWO DIFFERENT SETS OF LEGAL REGULATIONS

BACKGROUND OF THE INVENTION

The present invention relates to a headlight unit for a vehicle, and, more particularly, to a headlight unit for a vehicle comprising at least one low beam headlight and at least one high beam headlight and in which a high beam is propagated by the at least one high beam headlight that fulfills legal regulations for a high beam at least together with the low beam propagated by the at least one low beam headlight.

This type of headlight unit is known from German Patent Application DE 42 38 273 A1. The headlight unit disclosed in this reference has at least one high beam headlight and at least one low beam headlight. A low beam that fulfills legal regulations is propagated by the at least one low beam headlight. In contrast to the low beam a strongly concentrated high beam is propagated by the at least one high beam headlight that fulfills legal regulations for a high beam at least together with the low beam. The legal regulations for the high beam are uniformly prescribed by ECE rules in the European Union. However there are other legal regulations for the high beam prescribed in the SAE rules in the United States of America. Lower maximum light intensities for the center of the high beam are permitted by the SAE regulations than by the ECE regulations. However in contrast to the ECE rules a comparatively stronger horizontal scattering is prescribed by the SAE rules. Usually respective special high beam headlights are developed and manufactured to fulfill the different legal regulations according to the SAE rules and the ECE rules. This however leads to large production and installation expenses for the different high beam headlights.

SUMMARY OF THE INVENTION

It is an object of the present invention to provide a headlight unit for a vehicle that has the advantage that different sets of legal regulations are fulfilled with the same high beam headlight structure so that the manufacture is simplified and the installation expenses are reduced.

This object, and others which will be made more apparent hereinafter, are attained in a headlight unit comprising at least one low beam headlight and at least one high beam headlight and in which a high beam is propagated by the at least one high beam headlight that fulfills the sets of legal regulations for a high beam at least together with the low beam propagated by the at least one low beam headlight.

The headlight unit according to the invention includes at least one low beam headlight including means for propagating a low beam and at least one high beam headlight including means for propagating a high beam. The headlight unit is adapted for fulfilling at least two different sets of light intensity distribution requirements for the high beam.

The first set of light intensity distribution requirements for the high beam permit a first maximum light intensity in a center of the high beam and at least one first required light intensity in lateral regions of the high beam and a second set of light intensity distribution requirements for the high beam permit a second maximum light intensity in the center of the high beam that is lower than the first maximum light intensity and at least one second required light intensity in lateral regions of the high beam extending further from the center of the high beam than the lateral regions illuminated according to the requirements of the first set of light intensity distribution requirements.

The light intensities for fulfilling the second set of light intensity distribution requirements, at least in the lateral region on the opposing traffic side, are produced by the high beam issuing from the at least one high beam headlight and the second maximum light intensity according to the second set of light intensity distribution requirements is produced by the at least one high beam headlight.

In a preferred embodiment of the invention the light intensities for fullfilling the second set of light intensity distribution requirements are produced by the high beam propagated by the at least one high beam headlight only on the opposing traffic side and the light intensities for fulfilling the second set of light intensity distribution requirements on the side opposite the opposing traffic side are provided by the low beam propagated by the at least one low beam headlight.

In a preferred embodiment of the headlight unit according to the invention scattering of the high beam is required only on the opposing traffic side.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
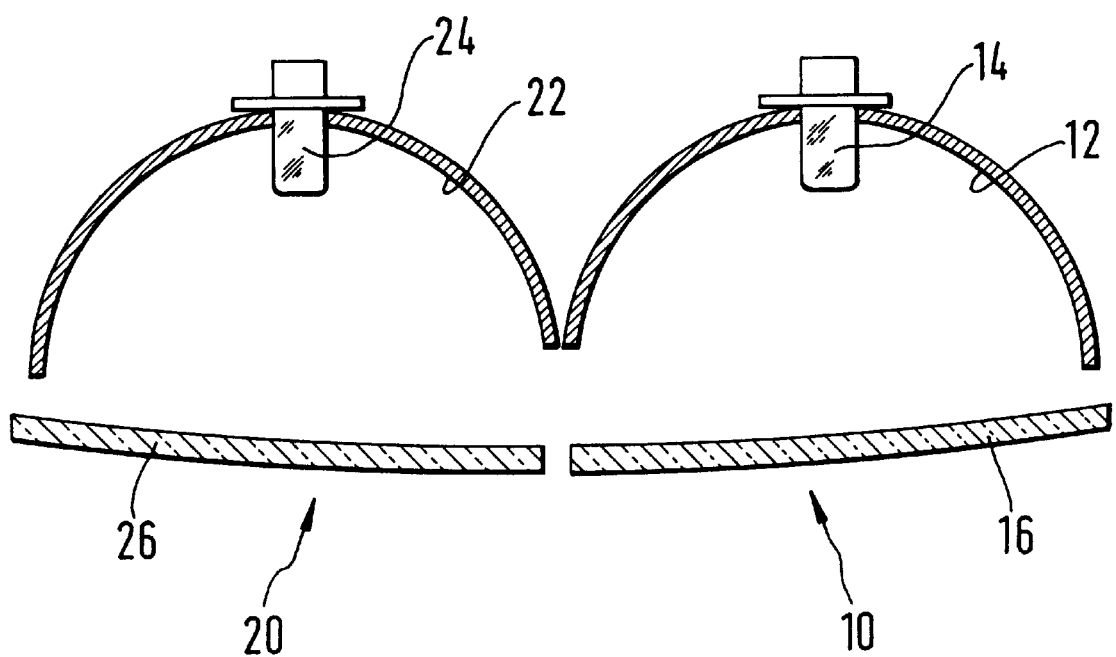
FIG. 1 is a simplified cross-sectional view through a headlight unit according to the invention having a high beam headlight and a low beam headlight.

A headlight unit for a vehicle, especially a motor vehicle, installed in a known way on the vehicle front end is shown in FIG. 1. The headlight has at least one low beam headlight 10, by which a low beam is propagated in operation that fulfills the legal regulations for a low beam. The position and course of the light-dark boundary of the low beam and a minimum and maximum value of the light intensity at different measurement points are prescribed by the legal regulations. The low beam headlight 10 has, for example, a reflector 12, in which a light source 14 is mounted, which, for example, can be an incandescent bulb or a gas discharge lamp. A light permeable disk 16 can be arranged in the path of the beam of light reflected by the reflector 12. The light permeable disk 16 can be formed substantially smooth so that the light beam reflected from the reflector and passing through the disk 16 is not substantially influenced when it already fulfills the legal requirements for the low beam. Alternatively the disk 16 can have an optical shape or profile, whereby the light reflected from the reflector 12 is deflected and/or scattered when it passes through the disk 16 and thus produces the required low beam.

The headlight unit has at least one high beam headlight 20 by which a high beam is propagated in operation. The high beam headlight 20 can have a reflector 22, in which a light source 2, for example an incandescent bulb or gas discharge lamp, is mounted. A light permeable disk 26 is provided in the path of the light reflected from the reflector 22, which simultaneously acts as a cover for the headlight. The disk 26 can be formed substantially smooth so that the light beam reflected from the reflector 22 and passing through the disk 26 is not substantially influenced when it already fulfills the legal requirements for the high beam. Alternatively the disk 26 can have an optical shape or profile, whereby the light reflected from the reflector 22 is deflected and/or scattered when it passes through the disk 26 and thus produces the required high beam.

Figure 2:
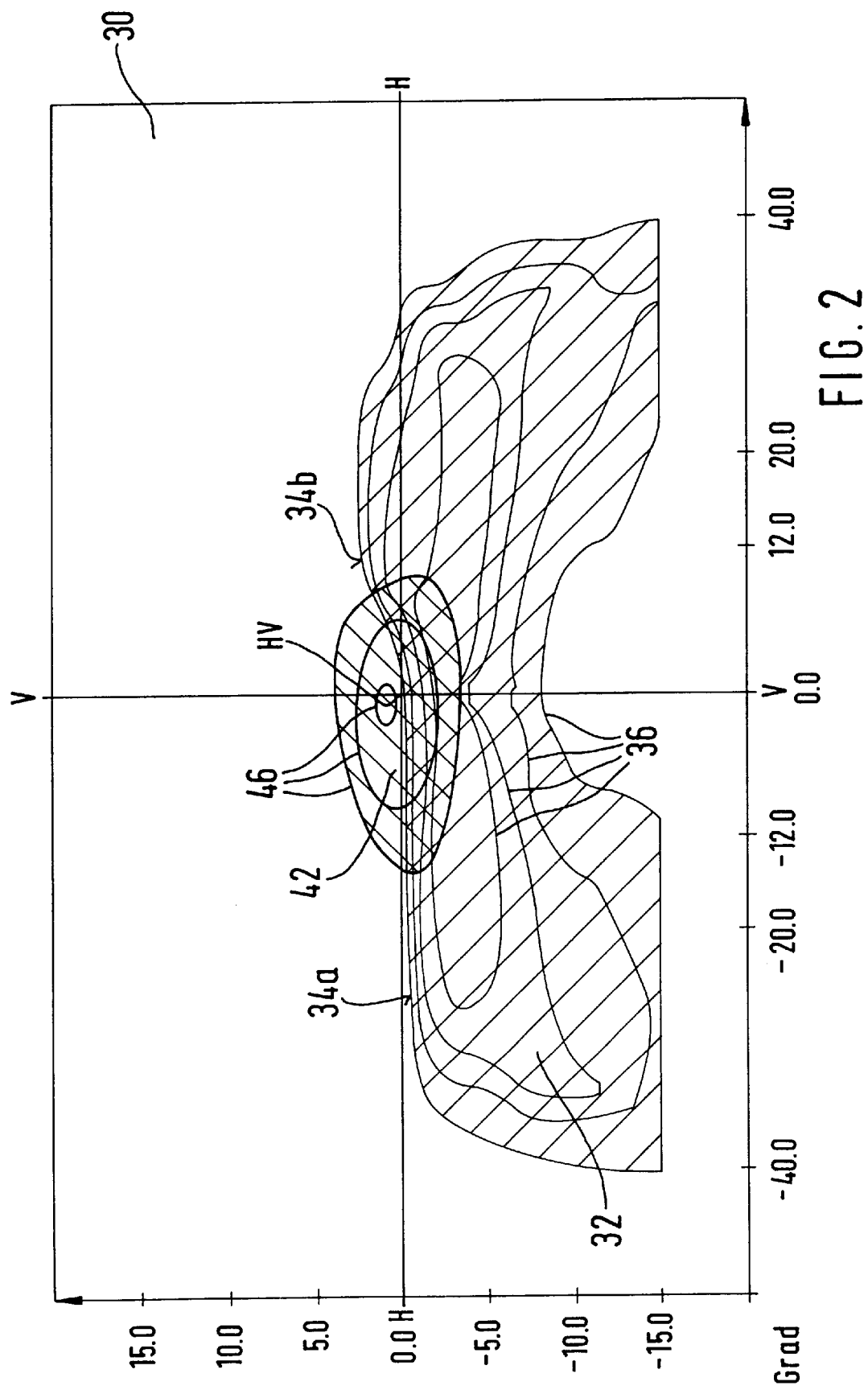
FIG. 2 is a diagrammatic illustration of the light intensities on a measuring screen illuminated by a light beam propagated from a first embodiment of the headlight unit according to the invention placed in front of the measuring screen.
Figure 3:
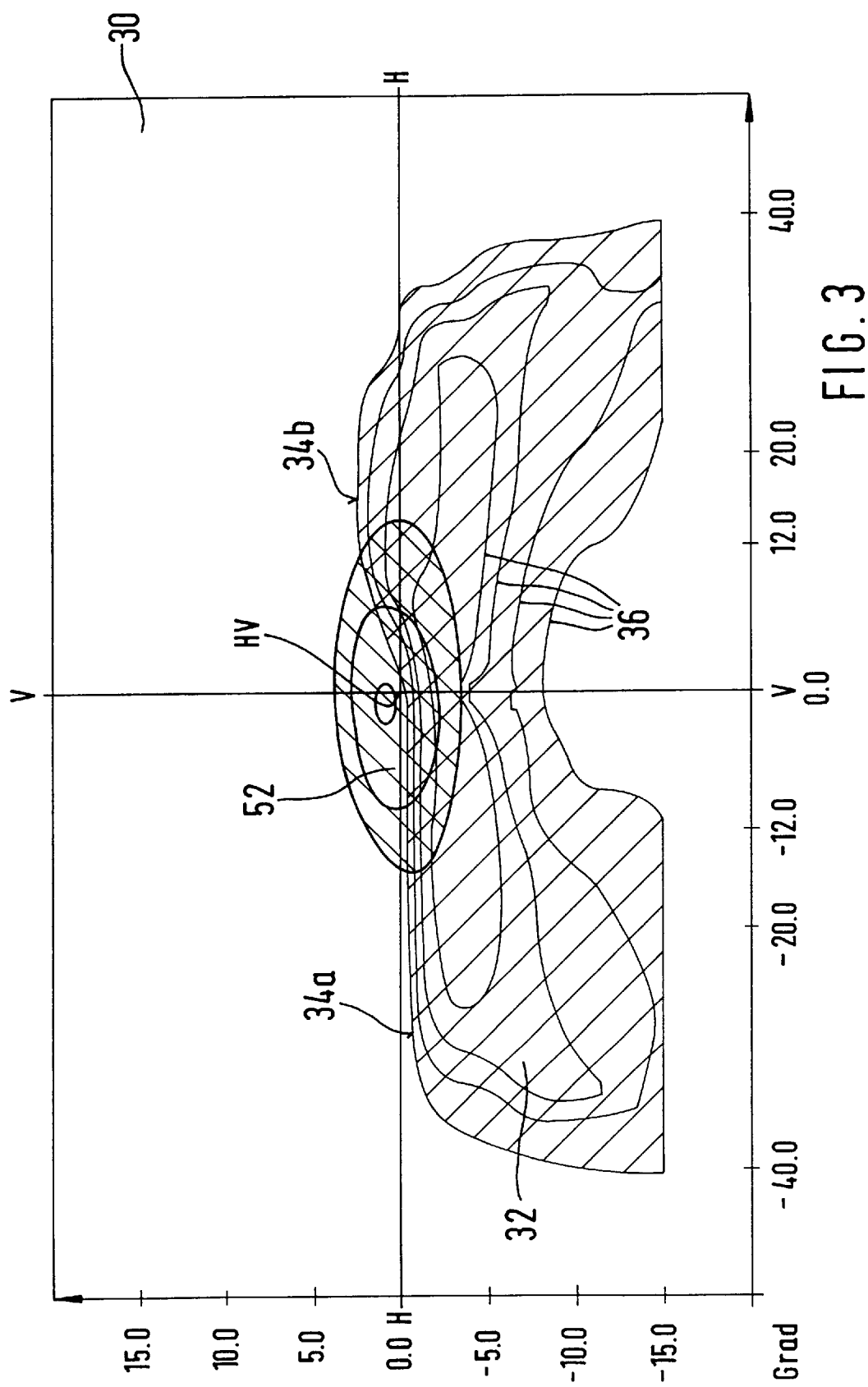
FIG. 3 is a diagrammatic illustration of the light intensities on a measuring screen illuminated by a light beam propagated from a second embodiment of the headlight unit according to the invention placed in front of the measuring screen.

In FIGS. 2 and 3 respective measurement screens 30 that are illuminated by light beams from the respective headlight units are shown spaced from the headlight units. The vertical center plane of the measuring screen 30 is indicated with VV and the horizontal center plane is indicated with HH. The intersection point of the vertical center plane VV and the horizontal center plane HH is designated with HV. The region indicated with 32 on the measuring screen 30 is illuminated by the low beam propagated from the low beam headlight 10. The region 32 has an upper light-dark boundary 34, which has an approximately horizontal section 3a extending under the horizontal center plane HH of the measuring screen 30 on the opposing traffic side, which means the left side of the measuring screen 30 in the illustrated embodiment for right-handed traffic. On the same traffic side, which means the right side of the measuring screen 30 for right-handed traffic in the illustrated embodiment, the light-dark boundary has a section 34b somewhat higher vertically relative to the section 34a. The section 34b of the light-dark boundary can rise from the section 34a, for example, up to an angle of about 15°, toward its right edge. Alternatively the section 34b of the light-dark boundary can also extend approximately horizontally in the vicinity of the horizontal center plane HH of the measuring screen 30 or somewhat above it. The highest light intensities are present in a zone containing the vertical center plane VV and somewhat under the horizontal center plane HH of the measuring screen 30 and the light intensities decrease toward the lateral edges and the lower edge of the region 32. This is clearly seen with the aid of the isolux lines 36, which are lines of equal intensity, illustrated in FIGS. 2 and 3. The low beam has horizontal scatter so that light intensities of about 0.4 Lux are present in area 32 in a lateral angle regions of about ±40°. The region 32 extends up to about 15° under the horizontal center plane HH of the measuring screen 30 in a vertical direction.

In FIG. 2 the measuring screen 30 is shown illuminated by the low beam issuing from at least one low beam headlight 10 and by the high beam issuing from at least one high beam headlight 20 according to a first embodiment. The high beam illuminates the measuring screen 30 in region 42 that has a reduced extension in comparison to the low beam region 32. The high beam region 42 extends vertically up to about 4° under the horizontal center plane HH of the measuring screen 30 and partially overlaps the low beam region 32; the high beam region 42 extends upward up to about 3° to 4° above the horizontal center plane HH. The high beam has a one-sided comparatively stronger scattering in a horizontal direction on the opposing traffic side, i.e. on the left side for the illustrated embodiment for right-handed traffic. The high beam region 42 extends left up to an angle region of about 10° to 14° relative to the vertical center plane VV, advantageously at least up to an angle region of about 12°. The horizontal scattering of the high beam is advantageously such that it produces light intensities of at least about 1.6 Lux in the high beam region 42 in an angle region of about 12°. The high beam region 42 extends to the right to an angle range of about 6° to 10° relative to the vertical center plane VV. The greatest illumination intensities are present in the high beam region 42 in a zone surrounding the point HV. These greatest illumination intensities reach a maximum of about 120 Lux. The light intensity decreases toward the edges of the high beam region, which is shown with the aid of isolux lines 46. The one-sided scattering of the high beam can be achieved by a suitable shape of the reflector 22 of the high beam headlight 20 or by a suitable scattering shape of cross-section of the disk 26.

The legal regulations in the USA for the high beam prescribed by SAE regulations require that the maximum light intensities may not exceed 12° Lux at the HV point. In the lateral angle regions of about ±12° light intensities of about 1.6 Lux must be present in the horizontal center plane HH and light intensities of about 2.4 Lux must be present about 2.5° under the horizontal center plane HH. In the embodiment of the high beam headlight 20 according to the first embodiment the light intensities required left of the vertical center plane VV in an angle range of about 12° are produced by the high beam that is scattered sufficiently to this side as explained previously. The light intensities required right of the vertical center plane VV in an angle region of about 12° are produced by the low beam whose light-dark boundary extends in the region of the horizontal center plane HH or above it on this side as explained previously. The low beam headlight 10 and the high beam headlight 20 are operated simultaneously during testing of the headlight unit to determine whether the legal requirements are fulfilled so that they are checked with the previously described embodiment of the high beam headlight.

ECE Rule 8 contains the legal requirements for the high beam in Europe. The light or illumination intensities at point HV must amount to at least about 48 Lux and may be as high as 240 Lux. These conditions are maintained by the previously described high beam headlight 20 according to the first embodiment with light intensities of about 120 Lux produced by it. Light intensities of at least about 6 Lux are required at measurement points that are arranged at about ±5.15 relative to the vertical center plane VV. These light intensities are maintained with the horizontal scattering by the high beam issuing from the high beam headlight 20 according to the first embodiment.

FIG. 3 shows the measuring screen 30 illuminated with the low beam propagated from the low beam headlight 10. The low beam illuminates the region 32. A region 52 of the measuring screen is illuminated by the high beam headlight 20 according to a second embodiment approximately symmetrically to the vertical plane VV in contrast to the first embodiment. The symmetric horizontal scattering of the high beam can be attained by suitable shaping of the reflector 22 or by suitable scattering from the disk 26. The vertical extent of the high beam region 52 is about the same as that of the high beam region 42 according to FIG. 2. The high beam region 52 extends on both sides of the center plane VV in the horizontal direction about 10° to 14°, advantageously about ±12°, relative to the vertical plane VV. The horizontal scattering of the high beam in the high beam region 52 is advantageously such that it produces light intensities of at least about 1.6 Lux in the horizontal plane HH and about 2.4 Lux about 2.5° under the horizontal center plane HH. The highest light intensities amounting to about 120 Lux are present in the high beam region 52 in a zone surrounding the point HV. The previously described legal requirements according to SAE rules are already fulfilled without simultaneous operation of the low beam headlight by the high beam issuing from the high beam headlight according to the second embodiment. Also the previously described legal regulations according the ECE rules are fulfilled.

The disclosure of German Patent Application 197 50 495.7 of Nov. 14, 1997 is hereby explicitly incorporated by reference. This German Patent Application discloses the same invention as described herein and claimed in the claims appended hereinbelow and is the basis for a claim of priority for the instant invention under 35 U.S.C. 119.

While the invention has been illustrated and described as embodied in a headlight for a vehicle fulfilling at least two different legal regulations, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A headlight unit comprising
   at least one low beam headlight including means for propagating a low beam,
   at least one high beam headlight including means for propagating a high beam,
   wherein said headlight unit is adapted for fulfilling at least two different sets of light intensity distribution requirements for the high beam;
   wherein a first set of light intensity distribution requirements for the high beam permit a first maximum light intensity in a center of the high beam not greater than 120 Lux and at least one first required light intensity in lateral regions of the high beam at about ±12° of at least about 1.6 Lux in a horizontal center plane and of at least about 2.4 Lux at about 2.5° under the horizontal center plane and
   wherein a second set of light intensity distribution requirements for the high beam permit a second maximum light intensity in the center of the high beam that is lower than the first maximum light intensity and from about 48 Lux to 240 Lux and at least one second required light intensity in lateral regions of the high beam extending further from the center of the high beam than the lateral regions illuminated according to the requirements of the first set of light intensity distribution requirements and of at least about 6 Lux at about ±5.15° relative to a vertical center plane; and
   wherein the light intensities for fulfilling the second set of light intensity distribution requirements, at least in the lateral region on the opposing traffic side, are produced by the high beam issuing from the at least one high beam headlight and the second maximum light intensity according to the second set of light intensity distribution requirements is produced by the at least one high beam headlight.

2. A headlight unit comprising
   at least one low beam headlight including means for propagating a low beam,
   at least one high beam headlight including means for propagating a high beam,
   wherein said headlight unit is adapted for fulfilling at least two different sets of light intensity distribution requirements for the high beam;
   wherein a first set of light intensity distribution requirements for the high beam permit a first maximum light intensity in a center of the high beam not greater than 120 Lux and at least one first required light intensity in lateral regions of the high beam at about ±12° of at least about 1.6 Lux in a horizontal center plane and of at least about 2.4 Lux at about 2.5° under the horizontal center plane; and
   wherein a second set of light intensity distribution requirements for the high beam permit a second maximum light intensity in the center of the high beam that is lower than the first maximum light intensity and from about 48 Lux to 240 Lux and at least one second required light intensity in lateral regions of the high beam extending further from the center of the high beam than the lateral regions illuminated according to the requirements of the first set of light intensity distribution requirements and of at least about 6 Lux at about ±5.15° relative to a vertical center plane; and
   wherein the light intensities for fulfilling the second set of light intensity distribution requirements, at least in the lateral region on the opposing traffic side, are produced by the high beam issuing from the at least one high beam headlight and the second maximum light intensity according to the second set of light intensity distribution requirements is produced by the at least one high beam headlight; and
   wherein the high beam headlight itself produces about 120 Lux at said center of the high beam and the light intensities to fulfill the second set of light intensity distribution requirements are produced by the high beam propagated by the at least one high beam headlight only on the opposing traffic side and the light intensities for fulfilling the second set of light intensity distribution requirements on the side opposite the opposing traffic side are provided by the low beam propagated by the at least one low beam headlight.

* * * * *